(12) United States Patent
Joergensen

(10) Patent No.: US 6,340,808 B2
(45) Date of Patent: Jan. 22, 2002

(54) BASE CONSTRUCTION FOR A COFFEE MAKING APPARATUS

(75) Inventor: Carsten Joergensen, St. Niklausen (CH)

(73) Assignee: PI-Design AG, Triengen (CH)

( * ) Notice: Subject to any disclaimer, the term of this patent is extended or adjusted under 35 U.S.C. 154(b) by 0 days.

(21) Appl. No.: 09/736,173

(22) Filed: Dec. 15, 2000

(30) Foreign Application Priority Data

Dec. 16, 1999 (DK) .......................................... 1999 1804

(51) Int. Cl.[7] .............................. A47J 31/24; A47J 31/30
(52) U.S. Cl. ........................ 219/433; 219/431; 219/432; 99/292
(58) Field of Search ................................. 219/431–433, 219/429, 435; 99/279–283, 292

(56) References Cited

U.S. PATENT DOCUMENTS

| | | | |
|---|---|---|---|
| 2,690,709 A | * 10/1954 | Farr et al. ...................... | 99/281 |
| 3,224,360 A | * 12/1965 | Wickenberg et al. ......... | 99/292 |
| 5,699,718 A | * 12/1997 | Yung et al. .................... | 99/292 |

* cited by examiner

Primary Examiner—Joseph Pelham
(74) Attorney, Agent, or Firm—Nath & Associates PLLC; Gary M. Nath; Marvin C. Berkowitz

(57) ABSTRACT

Regarding a base construction comprising a hot plate for a coffee-making apparatus of the type designed to have water brought to a boil in a closed container (1), whereupon the water is pressed through a riser pipe (12) into an open container (6), where boiling water extracts aromas and flavor from the ground coffee, whereupon the finished coffee beverage is filtered back into the closed container (1) through a filter placed at the outlet of the open container, the objective is to provide a sealed base construction which comprises a hot plate for a coffee-making apparatus where the hot plate does not suddenly boil dry, while the finished coffee beverage is carefully treated. Moreover, a reliable sealing of the hot plate must be provided, using simple means and without the use of tools.

According to the principles of the present invention, this objective is met by placing the hot plate and the inside bottom of the closed container in a position where the normal of the hot plate and/or the inside bottom is at no point vertical during boiling.

20 Claims, 5 Drawing Sheets

BASE CONSTRUCTION FOR A COFFEE MAKING APPARATUS

SCOPE OF THE INVENTION

This invention relates to a base construction comprising a hot plate for a coffee-making apparatus of the type designed to have water brought to a boil in a closed container, whereupon the water is pressed through a riser pipe into a funnel, where boiling water extracts aromas and flavour from the ground coffee, whereupon the finished coffee beverage is filtered back into the closed container through a filter placed at the outlet of the funnel.

STATE OF ART

The patent No. EP 98122329.0 exemplifies the principle of heating the water to boiling point by means of more than one hot plate, where one hot plate is used for boiling at high power, and another hot plate is used to maintain the temperature which is most beneficial to the finished coffee beverage. Naturally, a different, lower level of power is used for this purpose.

A similar device for making tea is known from EP 292 649, where the apparatus comprises at least one base consisting of a hot plate. As this known method is aimed specifically at tea-making, it is only marginally relevant here.

From the known designs, it is known that boiling ceases when a sudden and strong rise in temperature occurs, which indicates that the water has evaporated. This leaves the hot plate with a surface of dried-out sediments, which carbonate over time and become unpalatable. Moreover, the hot plate will still be considerably warmer than the coffee beverage upon the return of said beverage; this will damage the aroma of the beverage when it hits the hot plate. Another feature of the known design is that the base is sealed by means of either soldering or fastening by means of screws while using a seal between the hot plate and the base construction; this entails great cost in terms of assembly and production.

OBJECTIVE OF THE INVENTION

Consequently, the object of the present invention is to provide a sealed base which comprises a hot plate for a coffee-making apparatus where the hot plate does not suddenly boil dry, while the finished coffee beverage is treated with care. Moreover, reliable sealing of the hot plate must be provided, using simple means and without the use of tools.

According to the principles of the present invention, this objective is met by means of a base construction which comprises a hot plate for a coffee-making apparatus of the type initially mentioned, where the hot plate and the inside bottom of the closed container are placed in a position where the normal of the hot plate is at no point vertical during boiling, where the hot plate has been sealed towards a radial protrusion, which forms a flange in the bottom, by means of a U-shaped seal, where the points of the U are positioned on separate sides of the hot plate, and where the U-shaped seal is fastened in the flange by means of a clamping ring which squeezes the seal to the protrusion.

With a base according to the principles of the present invention, the evaporating water will drain the hot plate gradually, thus ensuring a continuous remaining volume of water in the lower part of the base. Thus, any sediments present in the water can be kept continually suspended, so that they do not contaminate the hot plate when it dries out and is subsequently reheated. As a result, the hot plate is heated inhomogenously, thus facilitating a more appropriate distribution of temperature across the hot plate, as the thermo-sensor is able to respond with greater speed when it is not in contact with the boiling water. The remaining water ensures that the finished coffee beverage is not subjected to a shock when meeting the hot plate, which still has a high temperature, when the finished coffee beverage returns to the closed container, thus running into the remaining volume present.

In one appropriate embodiment of the base according to the principles of the present invention, a locking ring is inserted between the clamping ring and the cylindrically upright part of the flange with a view to ensuring that the clamping ring is not loosened. Thus, the base appears as a self-locking system, which cannot be loosened unintentionally. The advantage is that water cannot seep into the electronics positioned beneath the base construction.

An appropriate construction can be achieved by having the outer surface of the U-yoke faintly arrow-shaped, with the greatest thickness outside the edge of the hot plate. This ensures easy mounting of the base with the U-shaped seal and moreover ensures that there is space for radial dilation of the seal, so that a very tight construction is achieved.

In a appropriate embodiment of the base construction according to the principles of the present invention, it is proposed that the thermo-sensor monitoring whether the hot plate boils dry should be placed in the area of the hot plate which is first to be exposed in the event of the water boiling away. Thus, the temperature is increased gradually, and any sediments present in the remaining volume can remain suspended and avoid drying out and burning.

A further appropriate embodiment of the base construction according to the principles of the present invention is designed so that the hot plate features two electrical circuits, a high-power circuit and a low-power circuit, where each circuit features a regulator circuit (not shown) in connection with a standard contactor where the regulator circuits are connected to the external power circuit. In this connection, both the high-power and low-power circuits are standard types with bimetal contacts controlled by thermo-sensors. It will be particularly appropriate for the hot plate to be fitted in a known manner with a contactor, which with respect to the low-power circuit is fitted with an additional contact pin which is fastened to the contactor by means of a guide tongue and a number of tongue pieces and locking hooks, and which is also fitted with a supply contact and a pair of spring pins ensuring contact to the low-power circuit. In this manner, any spring movement will occur perpendicular to the contact surface, and thus this construction ensures that friction cannot occur against the contact point of the circuit, which thus cannot be worn.

Further appropriate embodiments according to the principles of the present invention appear from the dependent claims.

SHORT DESCRIPTION OF THE DRAWINGS

The drawing depicts an embodiment according to the principles of the present invention. In this drawing.

Figure 1:
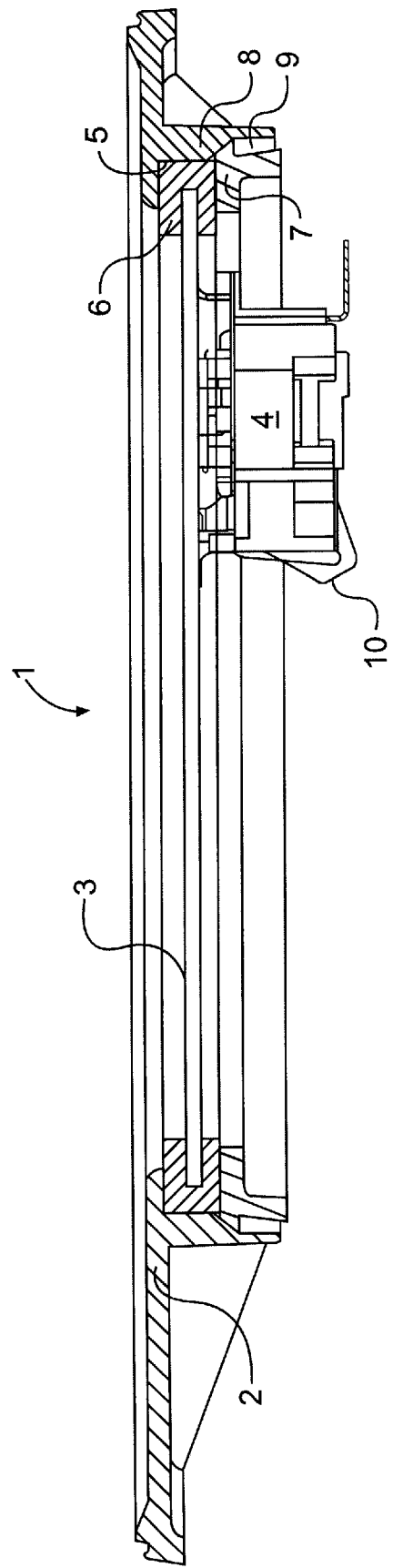
FIG. 1 depicts a cross-sectional view of the base construction according to the principles of the present invention.

FIG. 1 shows a cross-sectional view of the base construction 1 according to the principles of the present invention, which offers a peripheral view of a framework construction 2, which in the present embodiment is made of a suitable type of plastic. In the present embodiment, the hot plate 3 has been given an eccentric position in the base construction 1, thus facilitating better use of the space available on the underside of the hot plate 3, where the contactor 4 is also positioned immediately where the hot plate has its maximum elevation, i.e. the place of the hot plate 3 which is first to be exposed in the event of the water evaporating.

It will appear that the base construction has a downward-turned flange 5, the internal diameter of which is slightly smaller than the outer diameter of the hot plate 3. This ensures that the hot plate 3 cannot be accidentally sucked up into the closed container in the event of a powerful vacuum.

Around the edge of the hot plate 3 is shown the U-shaped seal 6 (depicted in FIG. 2), which is held inside the flange 5 by means of a clamping ring 7. In the space between the clamping ring 7 and the cylindrically upright part 8 of the flange, a locking ring 9 can be seen. This locking ring 9 is wedged in such a manner as to squeeze the clamping ring 7 down towards the U-shaped seal 6. This provides the possibility of assembling the base construction without the use of tools, and similarly this work can be executed with a high degree of quality by unskilled labour.

Figure 2:
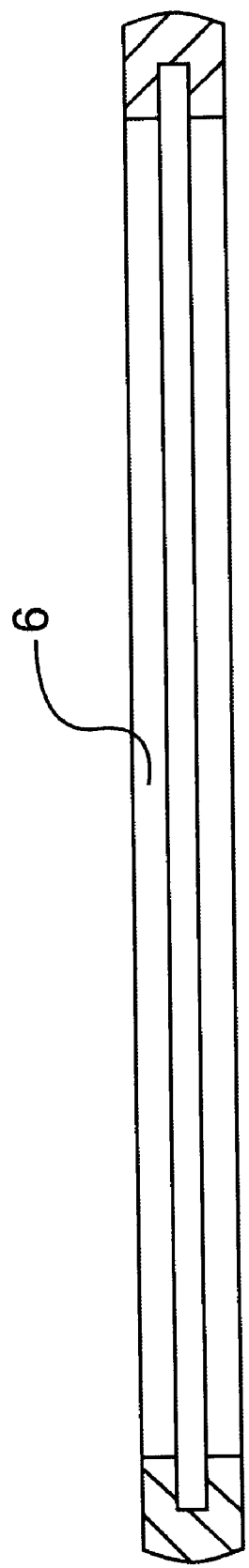
FIG. 2 depicts a cross-section of the U-shaped seal for the hot plate prior to mounting in the base construction.

The U-shaped seal in FIG. 2 is designed with pins which are in contact with separate sides of the hot plate 3. The U-yoke, which in the present embodiment tapers slightly towards the flange 5, will provide a seal both axially and radially when placed in the flange 5, and when the clamping ring 7 is subsequently mounted.

Figure 3:
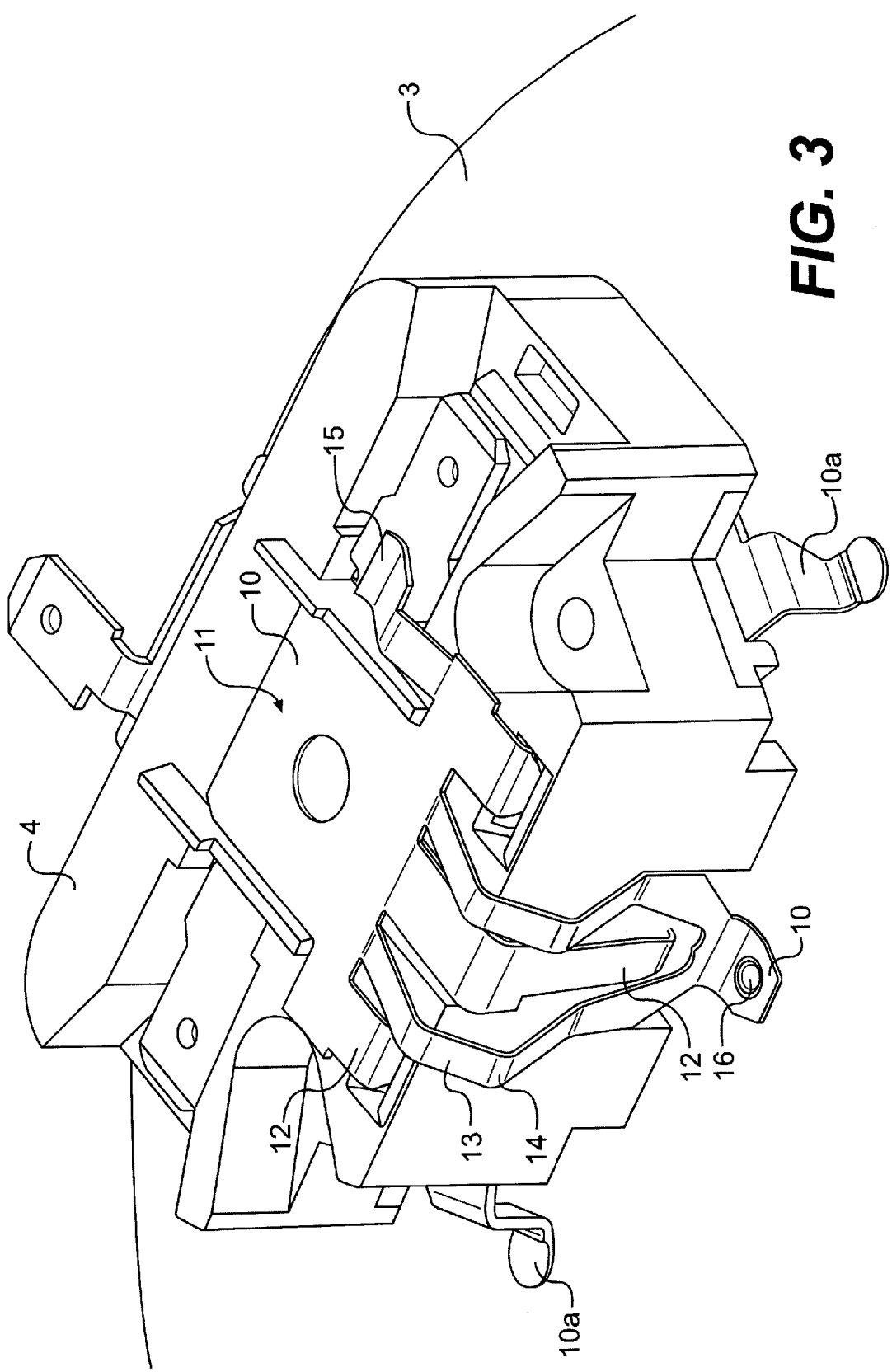
FIG. 3 shows a perspective representation of the hot plate at the regulator circuit, with the third contact fastened on the upward-facing side of the Figure.
Figure 4:
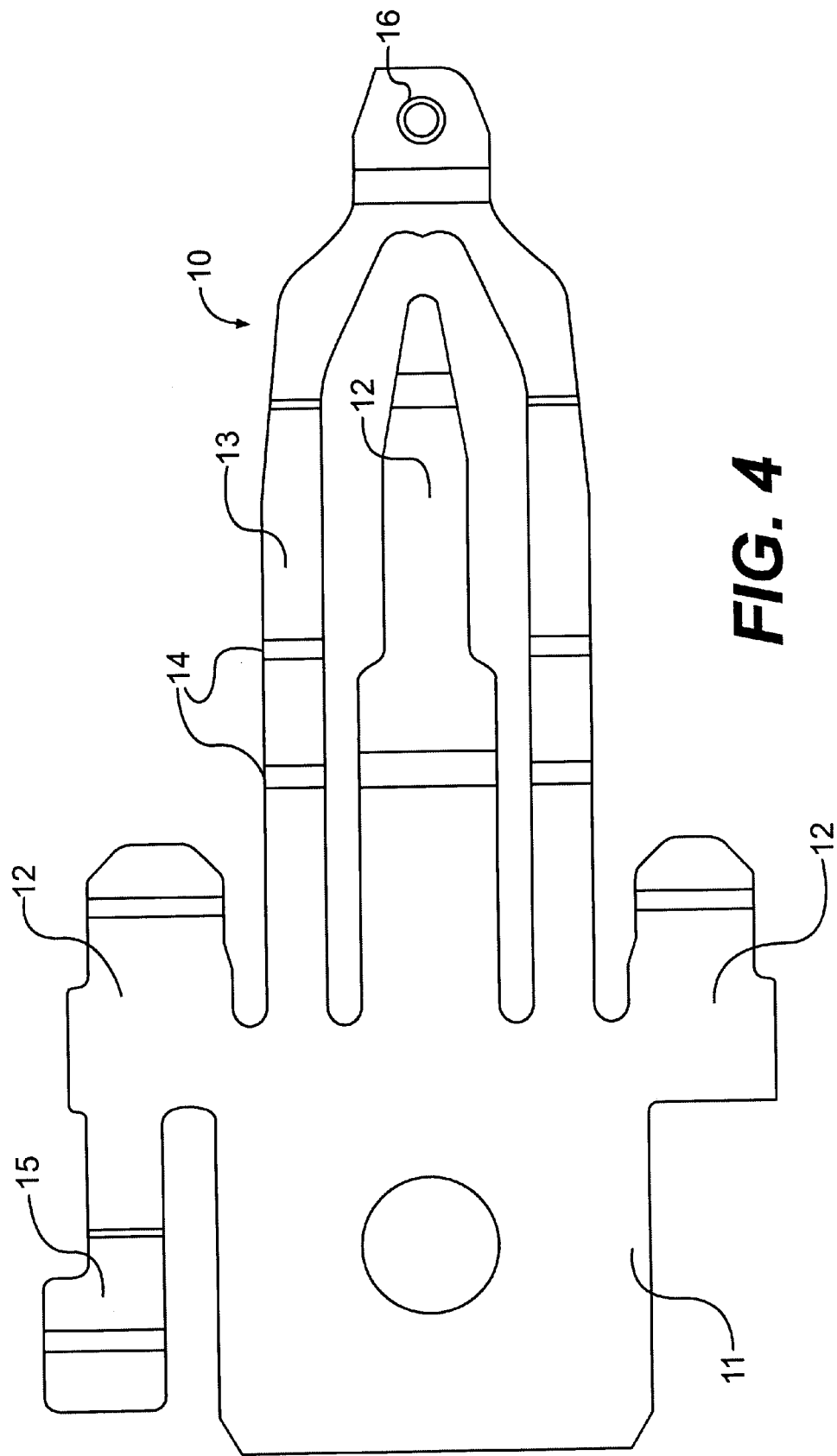
FIG. 4 shows a representation of the third contact pin prior to folding.

On the underside of the hot plate 3 in FIG. 3, it is possible to see the contactor 4, which has been placed in the area of the base construction which offers the most space after assembly. The contactor 4, which is a modified standard model featuring bimetal contacts (not shown), is inserted between the wiring for the external power supply and the regulator circuits, thus ensuring simple yet reliable assembly and contact between the power supply and the three circuits of the hot plate. The contactor 4 is mounted on the side of the hot plate which also features the heating circuit (not shown). Here, the contact pins 10a also serve to fasten the contactor 4. Two regulated circuits are then required for use in the base construction according to the principles of the present invention; a fact which entails that a third contact pin 10 must be provided on the standard construction for the low-power circuit. This third contact pin 10 is folded from a standard metal sheet, which is punched out as depicted in FIG. 4. The third contact pin 10 comprises a guide tongue 11, which serves to guide the contact pin 10, as well as tongue pieces and locking hooks 12, which when suitably folded can lock the third contact pin 10 in the grooves present in the contactor 4. The spring pins 13 extend with several successive folds 14 from the guide tongue 11 to the contact point on the hot plate 3. The objective of these folds is to ensure that the third contact pin 10 moves only at a right angle to the hot plate 3, thus providing frictionless and effective contact at the contact point 16, without causing any wear. Moreover, a supply contact 15 runs along the guide tongue 11 to the low-power circuit. This establishes an electric connection between the external supply circuit and the low-power circuit.

Figure 5:
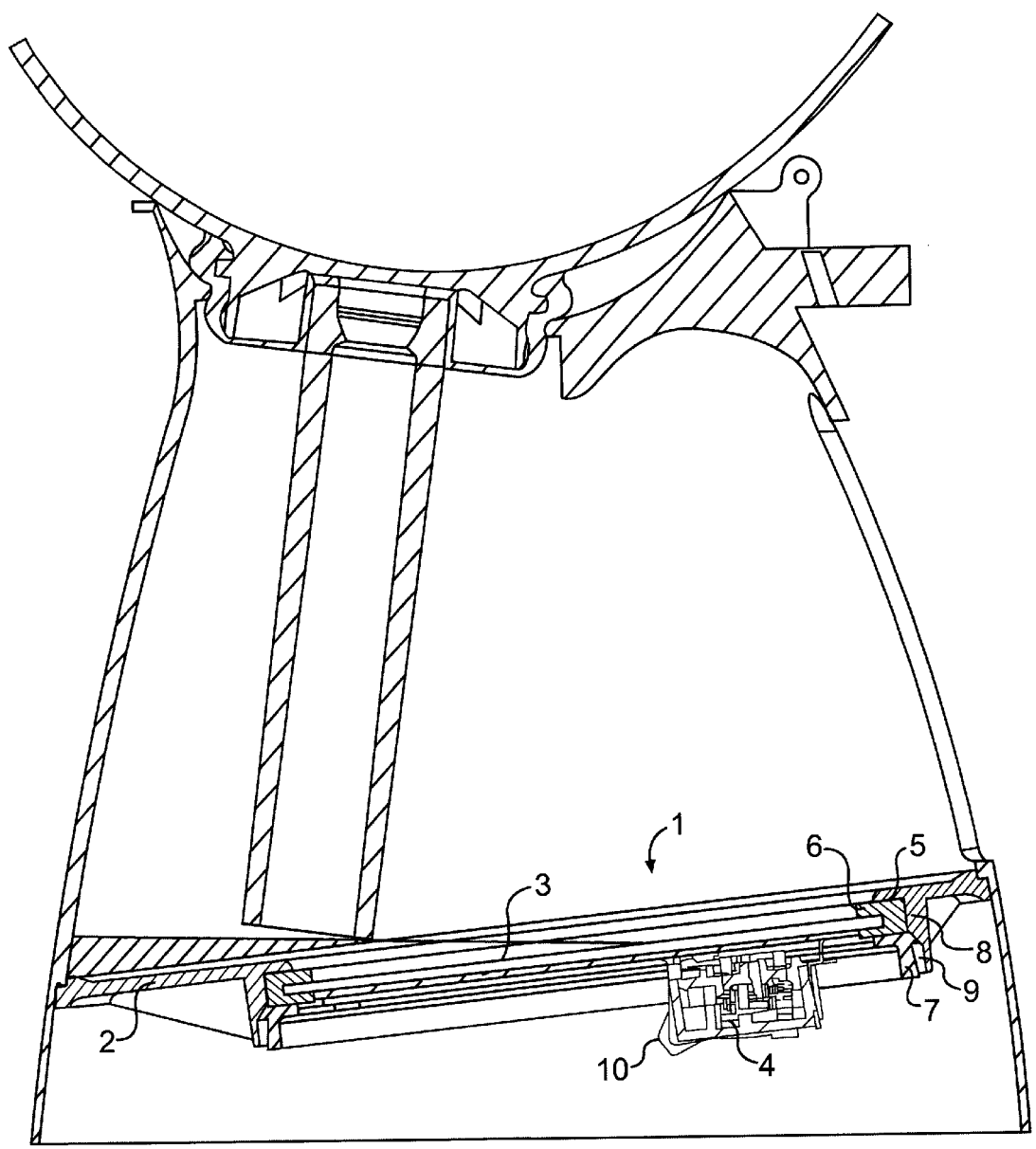
FIG. 5 is a cross-sectional outline through a coffee-making apparatus fitted with a base construction according to the principles of the present invention.

FIG. 5 features a cross-sectional outline through a coffee-making apparatus fitted with a base construction according to the principles of the present invention. It will appear that the sloping position of the base helps to ensure partly that the hot plate 3 does not suddenly boil dry, and partly that the total volume of water does not evaporate during boiling, insofar as the lower, remaining volume of water cannot be heated by means of the hot plate 3. This small remaining volume of water ensures that the temperature will always be 100° C. or slightly lower when boiling is complete, thus keeping the coffee beverage returning through the filter and funnel to the closed container from becoming overheated.

The embodiment shown is an example only and is not limited to that which is depicted in the drawings. Changes and variations which are obvious to experts are also included in the scope of this invention.

What is claimed is:

1. A base construction for a coffee-making apparatus of the type wherein water is brought to a boil in a closed container having an internal bottom and pressed through a riser pipe into a funnel, where the boiling water extracts aromas and flavour from ground coffee, the coffee then being filtered back into the closed container through a filter placed at an outlet of the funnel, wherein the hot plate and the internal bottom of the closed container are positioned so that a line normal to the hot plate and the internal bottom is at no point vertical during boiling.

2. Base construction according to claim 1, wherein the internal bottom further comprises:
    a flange having a radial protrusion;
    a U-shaped seal disposed around a perimeter of the hot plate, the seal having respective points of the U disposed on opposite sides of the hot plate; and
    a clamping ring;
    wherein the seal is sealingly squeezed between the radial protrusion and the clamping ring.

3. Base construction according to claim 2, further comprising a locking ring disposed between the clamping ring and a cylindrically upright part of the flange.

4. Base construction according to claim 2, wherein an outer surface of a base of the U-shaped seal is faintly arrow-shaped, having a greatest thickness outside an edge of the hot plate.

5. Base construction according to claim 1, wherein the hot plate is fastened in an eccentric position on an inside of the base.

6. Base construction according to claim 5, wherein the hot plate is fastened in a position near a highest part of the base.

7. Base construction according to claim 5, further comprising a thermo-sensor that monitors whether the hot plate boils dry disposed in an area of the hot plate first exposed when water boils away.

8. Base construction according to claim 1, further comprising a contactor having conventional contact pins and an additional contact pin for a low-power circuit.

9. Base construction according to claim 8, wherein the additional contact pin is fastened to the contactor by means of a guide tongue and a number of tongue pieces and locking hooks.

10. Base construction according to claim 8, wherein the additional contact pin further comprises an external supply contact and a pair of spring pins.

11. Base construction according to claim 3, wherein an outer surface of a base of the U-shaped seal is faintly arrowshaped, having a greatest thickness outside an edge of the hot plate.

12. Base construction according to claim 2, wherein the hot plate is fastened in an eccentric position on an inside of the base.

13. Base construction according to claim 3, wherein the hot plate is fastened in an eccentric position on an inside of the base.

14. Base construction according to claim 4, wherein the hot plate is fastened in an eccentric position on an inside of the base.

15. Base construction according to claim 6, further comprising a thermo-sensor that monitors whether the hot plate boils dry disposed in an area of the hot plate first exposed when water boils away.

16. Base construction according to claim 7, further comprising a contactor having conventional contact pins and an additional contact pin for a low-power circuit.

17. Base construction according to claim 16, wherein the additional contact pin is fastened to the contactor by means of a guide tongue and a number of tongue pieces and locking hooks.

18. Base construction according to claim 9, wherein the additional contact pin further comprises an external supply contact and a pair of spring pins.

19. Base construction according to claim 16, wherein the additional contact pin further comprises an external supply contact and a pair of spring pins.

20. Base construction according to claim 17, wherein the additional contact pin further comprises an external supply contact and a pair of spring pins.

* * * * *